(12) United States Patent
Wessling et al.

(10) Patent No.: US 10,445,669 B2
(45) Date of Patent: Oct. 15, 2019

(54) SYSTEM AND METHOD FOR MAPPING RESERVOIR PROPERTIES AWAY FROM THE WELLBORE

(71) Applicants: Stefan Wessling, Hannover (DE); Theodorus Geerits, Nienhagen (DE); Holger Mathiszik, Eicklingen (DE); Andreas Hartmann, Celle (DE)

(72) Inventors: Stefan Wessling, Hannover (DE); Theodorus Geerits, Nienhagen (DE); Holger Mathiszik, Eicklingen (DE); Andreas Hartmann, Celle (DE)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 94 days.

(21) Appl. No.: 15/360,059

(22) Filed: Nov. 23, 2016

(65) Prior Publication Data
US 2017/0145804 A1    May 25, 2017

Related U.S. Application Data

(60) Provisional application No. 62/259,862, filed on Nov. 25, 2015.

(51) Int. Cl.
| | |
|---|---|
| *G06Q 10/06* | (2012.01) |
| *G01V 1/52* | (2006.01) |
| *E21B 7/04* | (2006.01) |
| *G01V 1/50* | (2006.01) |
| *G01V 3/26* | (2006.01) |

(Continued)

(52) U.S. Cl.
CPC ........... *G06Q 10/0631* (2013.01); *E21B 7/04* (2013.01); *E21B 49/00* (2013.01); *G01V 1/50* (2013.01); *G01V 1/52* (2013.01); *G01V 3/26* (2013.01); *G01V 11/00* (2013.01); *G01V 2210/614* (2013.01); *G01V 2210/6163* (2013.01); *G01V 2210/6169* (2013.01);

(Continued)

(58) Field of Classification Search
CPC .................................................. G06Q 10/0631
See application file for complete search history.

(56) References Cited

U.S. PATENT DOCUMENTS

| | | |
|---|---|---|
| 8,498,848 B2 | 7/2013 | Habashy et al. |
| 2004/0245016 A1 | 12/2004 | Chemali et al. |

(Continued)

FOREIGN PATENT DOCUMENTS

WO    2011022012 A1    2/2011

OTHER PUBLICATIONS

International Search Report and the Written Opinion of the International Searching Authority, or the Declaration; PCT/US2016/063494; dated Mar. 13, 2017; 13 pages.

(Continued)

*Primary Examiner* — Manuel A Rivera Vargas
(74) *Attorney, Agent, or Firm* — Cantor Colburn LLP

(57) ABSTRACT

A method for adjusting a parameter of a wellbore operation includes: conveying a carrier through the wellbore; performing a resistivity measurement on the formation using a resistivity tool disposed on the carrier; performing an acoustic measurement on the formation using an acoustic tool disposed on the carrier; generating with a at least one processor a map of the formation using the resistivity measurement and the acoustic measurement, and adjusting the parameter using the map.

21 Claims, 15 Drawing Sheets

(51) Int. Cl.
*G01V 11/00* (2006.01)
*E21B 49/00* (2006.01)
(52) U.S. Cl.
CPC ............... *G01V 2210/6226* (2013.01); *G01V 2210/6242* (2013.01); *G01V 2210/6244* (2013.01); *G01V 2210/64* (2013.01)

(56) References Cited

U.S. PATENT DOCUMENTS

| | | |
|---|---|---|
| 2009/0271117 A1 | 10/2009 | Ayoub et al. |
| 2011/0054795 A1 | 3/2011 | Klein et al. |
| 2011/0088895 A1* | 4/2011 | Pop .......................... E21B 7/04 166/254.2 |
| 2012/0041738 A1 | 2/2012 | Habashy et al. |

OTHER PUBLICATIONS

Jeong, Cheolkyun; "Integrated Data Analysis Using Electrofacies and Seismic Attribute for REservoir Modeling";2010; Paper Department of Energy Resources Engineering Stanford University; Retrieved from the Internet URL:https://pangea.stanford.edu/departments/ere/dropbox/scrf/documents/reports/23/SCRF2010_Report23/SCRF2010_18.Cheolkyun_Jeong_SCRF.pdf; 17 pages.

* cited by examiner

Embedded Stack

Amalgamated Stack

Modified Embedded Stack

Lateral Offset Stack

Retrogradeational Embedded Stack

Climbing Stack

Compensational Stacking

Vertical Stack

Obstructed Stacking

SYSTEM AND METHOD FOR MAPPING RESERVOIR PROPERTIES AWAY FROM THE WELLBORE

CROSS REFERENCE TO RELATED APPLICATIONS

This application claims the benefit of an earlier filing date from U.S. Provisional Application Ser. No. 62/259,862 filed Nov. 25, 2015, the entire disclosure of which is incorporated herein by reference.

BACKGROUND

Typically, it takes a large capital investment to implement exploration and production processes for producing hydrocarbons. The processes include drilling boreholes into geologic formations having reservoirs of the hydrocarbons and then completing the boreholes used for extraction of the hydrocarbons. In that drilling boreholes is a costly process, it is desired that each borehole be drilled with a specific location and geometry that provides the maximum production benefit. Hence, it would be appreciated in the hydrocarbon production and exploration industries if techniques could be developed to accurately estimate locations of hydrocarbons in geologic formations so that borehole trajectories could be accurately planned and drilled to reach the hydrocarbons locations.

BRIEF SUMMARY

Disclosed is a method for adjusting a parameter of a wellbore operation includes: conveying a carrier through the wellbore; performing a resistivity measurement on the formation using a resistivity tool disposed on the carrier; performing an acoustic measurement on the formation using an acoustic tool disposed on the carrier; generating with a processor a map of the formation using the resistivity measurement and the acoustic measurement, and adjusting the parameter using the map.

Also disclosed is an apparatus for adjusting a parameter of a wellbore operation, the apparatus comprising: a carrier configured to be conveyed through the wellbore; a resistivity tool disposed on the carrier and configured to perform a resistivity measurement on the formation; an acoustic tool disposed on the carrier and configured to perform an acoustic measurement on the formation; and a processor. The processor is configured to generate a map of the formation using the resistivity measurement and the acoustic measurement and adjust the parameter using the map.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method presented herein by way of exemplification and not limitation with reference to the figures.

Disclosed are method and apparatus for making strategic decisions for producing hydrocarbons. The strategic decisions are based on accurate estimates of locations of hydrocarbons in geologic formations so that wellbore operations can be adjusted and/or borehole trajectories can be accurately planned and drilled to reach the hydrocarbons locations. Multiple measurements out of the same borehole of different properties are used to iteratively refine the distribution of a formation property around the borehole. The benefit or added value of such a combined interpretation of formation property distributions is the increase in accuracy of the property distribution. For example, the accuracy of resistivity distributions increases when the distribution is constrained by structural and/or geometrical information from different logging data. Additional factors for increased accuracy (for each measurement individually but also for the combination of them): Better depth coverage with increasing measured depth (MD); Different inversion strategies/physics; Different spatial sampling of different methods; Different depth of investigations of different methods; and combinations thereof (e.g. different sequences for up-/downscaling, inversion steps, filtering, etc.) The resulting quantitative resistivity distribution can then be used for petrophysical analysis of hydrocarbon and water saturations away from the wellbore or borehole, which provides a means to accurately map a formation property, such as the distribution of hydrocarbon resources, around a borehole. Such maps can then be used to determine net-to-gross which is the fraction of productive rock interval from a total rock interval, and reservoir engineering and production engineering methods can be applied to determine the reserves which are producible from the formation around a wellbore. In addition, reservoir navigation decisions can be made about drilling into remote reservoir bodies for which the resistivity map provides insight into the hydrocarbon saturation in that remote boundary. It can be appreciated that the term "map" is not to be construed to be limited to hydrocarbon distribution, but may include other property or parameter distributions.

Figure 1:
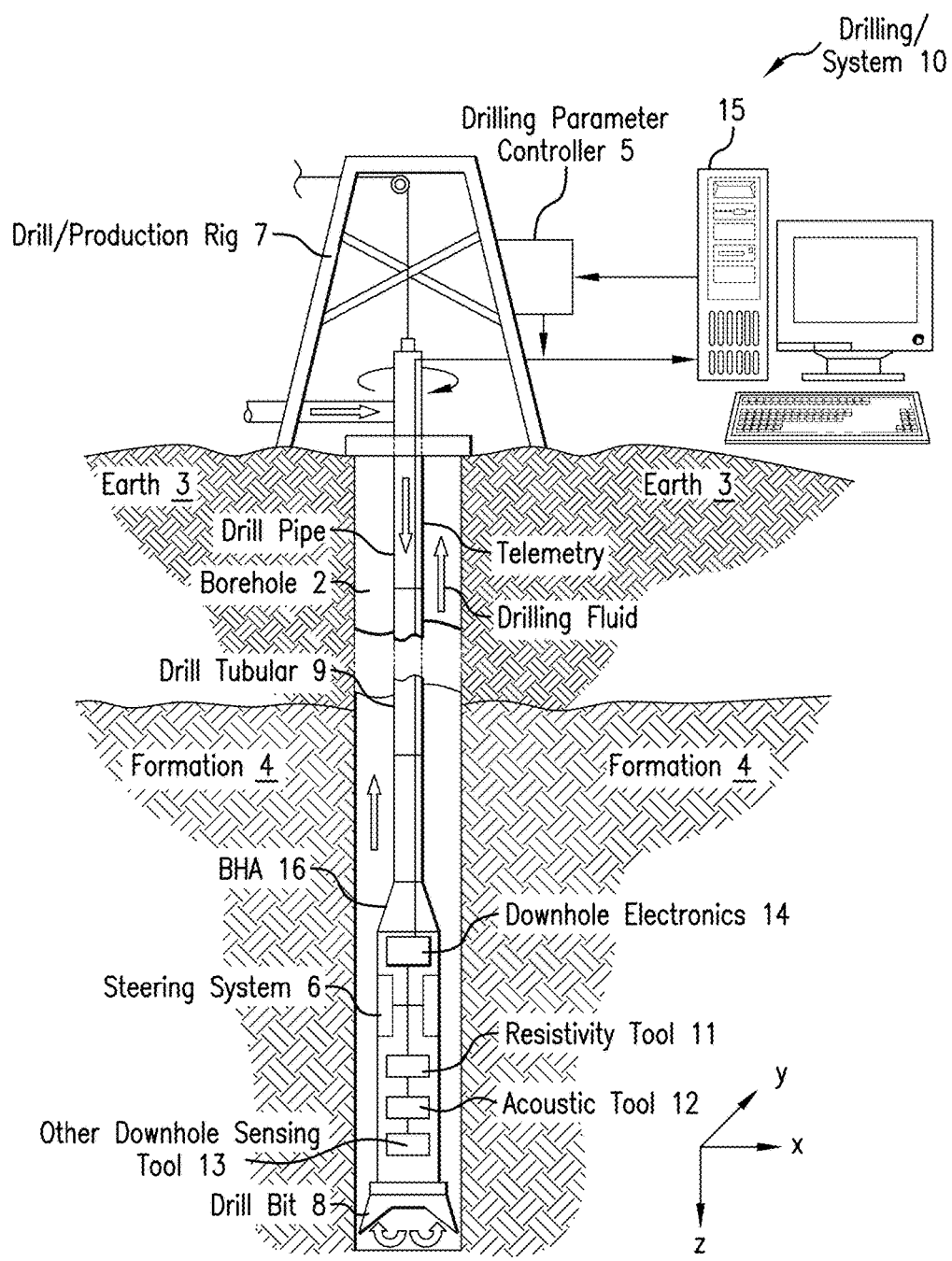
FIG. 1 illustrates a cross-sectional view of an embodiment of a drill string disposed in a borehole penetrating the earth.

Next, one example of apparatus for implementing the disclosure is discussed. FIG. 1 illustrates a cross-sectional view of an embodiment of a drilling system 10 that is configured to drill a borehole 2 into the earth 3 with a desired trajectory. The earth 3 includes an earth formation 4 that may include a reservoir of hydrocarbons. The drilling system 10 includes a drill tubular 9 having a drill bit 8. The drill tubular 9 may be made up of a plurality of drill pipe sections coupled together. A drill bit 8 is disposed at the distal end of the drill tubular 9. A drill rig 7 is configured to conduct drilling operations such as rotating the drill tubular 9 at a certain rotational speed and torque and, thus, rotating the drill bit 8 in order to drill the borehole 2. In addition, the drill rig 7 is configured to pump drilling fluid through the drill tubular 9 in order to lubricate the drill bit 8 and flush cuttings from the borehole 2. A steering system 6 is coupled to the drill tubular 9 and is configured to control the trajectory of the borehole 2 being drilled. A drill rig controller 5 is configured to control drill rig parameters including the borehole trajectory using steering system 6.

A bottomhole assembly (BHA) 16, which may include the drill bit 8, is coupled to the drill tubular 9. The BHA 16 includes a resistivity tool 11 configured to sense resistivity of the formation 4 surrounding the borehole 2. The term "resistivity tool" can encompass one or more different types of resistivity tools as known in the art. In one or more embodiments, the resistivity tool 11 is an induction tool that senses resistivity deeper into the formation 4 than other types of resistivity tools. Other types of shallow-reading or deep-reading resistivity tools may also be used individually or in combination. It is well understood that, for resistivity or conductivity measurement tools, a distinction may be made between apparent resistivity and true resistivity, and that processing or a transformation may be necessary to convert tool readings from apparent resistivities into true formation resistivities. In one embodiment, the resistivity tool 11 includes upper and lower long- and short-spaced transmitters surrounding a central receiver pair. Antenna spacings in one or more embodiments can range from 23 to 35 inches. Other antenna spacings, smaller or larger, may also be used. The two receivers measure the phase shift and attenuation of 2-MHz and 400-kHz signals broadcast by each transmitter to yield a total of eight logs. The amount of delivered logs depends on the processing schemes of raw data. Different processing algorithms may yield different amounts of logs. Other frequencies of broadcast signals may also be used. In another embodiment, the resistivity tool includes a module containing a transmitter and a second module containing a transmitter and 2 receivers, operating at 20-kHz and 50-kHz. The modules are spaced apart on the drillstring to achieve larger depth of detection. The number of modules and transmission frequencies could be changed. In another embodiment, a tool operating at 400-kHz and 2-MHz is operated in the same BHA together with a modular tool operating at 20-kHz and 50-kHz.

Figure 2:
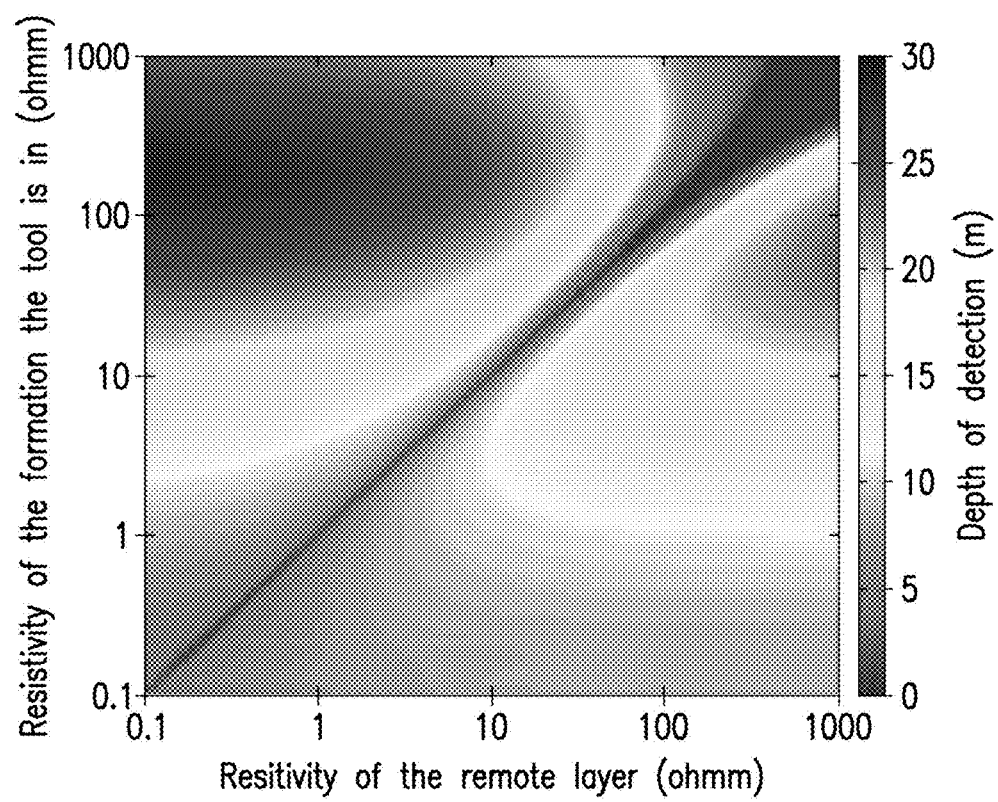
FIG. 2 depicts aspects output from a resistivity tool.

The resistivity tool 11 is sensitive to contrasts in the electrical resistivity of formations around and away from the wellbore and thus is able to provide a distribution of resistivity values (i.e., resistivity values and corresponding locations) within the formation around a borehole. FIG. 2 provides a so-called Picasso plot illustrating the depth of detection for remote bed boundaries using the VisiTrak service available from Baker Hughes Incorporated of Houston, Tex. Accordingly, the depth of detection depends on the resistivity contrast between the penetrated and the remote layer to be evaluated. Deep-reading here refers to measurements reading in a radius larger than 0.5 m (as one example). FIG. 2 illustrates that deep readings of 30 meters are possible. Of course for those skilled in the art, 30 m is not a fixed value. Rather, the depth of detection and/or depth of investigation depends on the wavelength and/or frequency of the resistivity tool and the formation properties, hence the depth of detection and/or depth of investigation can be different for different tool and/or BHA configurations.

Referring to FIG. 1, the BHA 16 also includes an acoustic tool 12 that is configured to obtain information about subsurface structures and/or acoustic wave propagation velocities using acoustic waves. For clarity purposes, acoustic wave frequencies used by an acoustic tool may also include seismic wave frequencies so that an acoustic tool may also be referred to as a seismic tool. Acoustic waves transmitted by the acoustic tool 12 are transmitted into the formation 4 and then are reflected at boundaries with high acoustic impedance contrast close enough to be reachable by the acoustic waves and finally are recorded by acoustic receivers which are also positioned in the BHA 16. This method may be referred to as deep shear wave imaging or deep compressional wave imaging. The acoustic tool 12 provides an image clearly illustrating geological structures in the formation or reservoir if impedance contrasts exist. In addition, acoustic waves traveling along the borehole wall (refracted waves) and/or acoustic waves guided by the borehole (guided waves) may be used to determine the acoustic wave propagation velocity at the vicinity of the borehole. Borehole guided waves (e.g., Stoneley waves) might also be used for imaging of structures crossing the wellbore. Converted waves (e.g., PS waves) may also be considered of imaging.

The BHA 16 may also include one or more other sensing tools 13 that are configured to sense other parameters. Non-limiting embodiments of another sensing tool 13 include a neutron tool (which can have a neutron emitter and a gamma-ray detector and/or a neutron detector for detecting radiation due to formation interaction with the emitted neutrons), a natural gamma-ray detector, a dielectric tool, and a gravity tool, a magnetic resonance tool, a seismic-while-drilling tool.

Downhole electronics 14 are configured to operate tools in the BHA 16 and/or act as an interface with telemetry to communicate sensed data to the surface such as to a computer processing system 15 or to receive commands from the surface. Non-limiting embodiments of telemetry include mud-pulse telemetry and wired drill pipe. Data processing functions and/or control functions may be accomplished downhole by the downhole electronics 14, at the surface by the computer processing system 15, or by some combination thereof.

Figure 3:
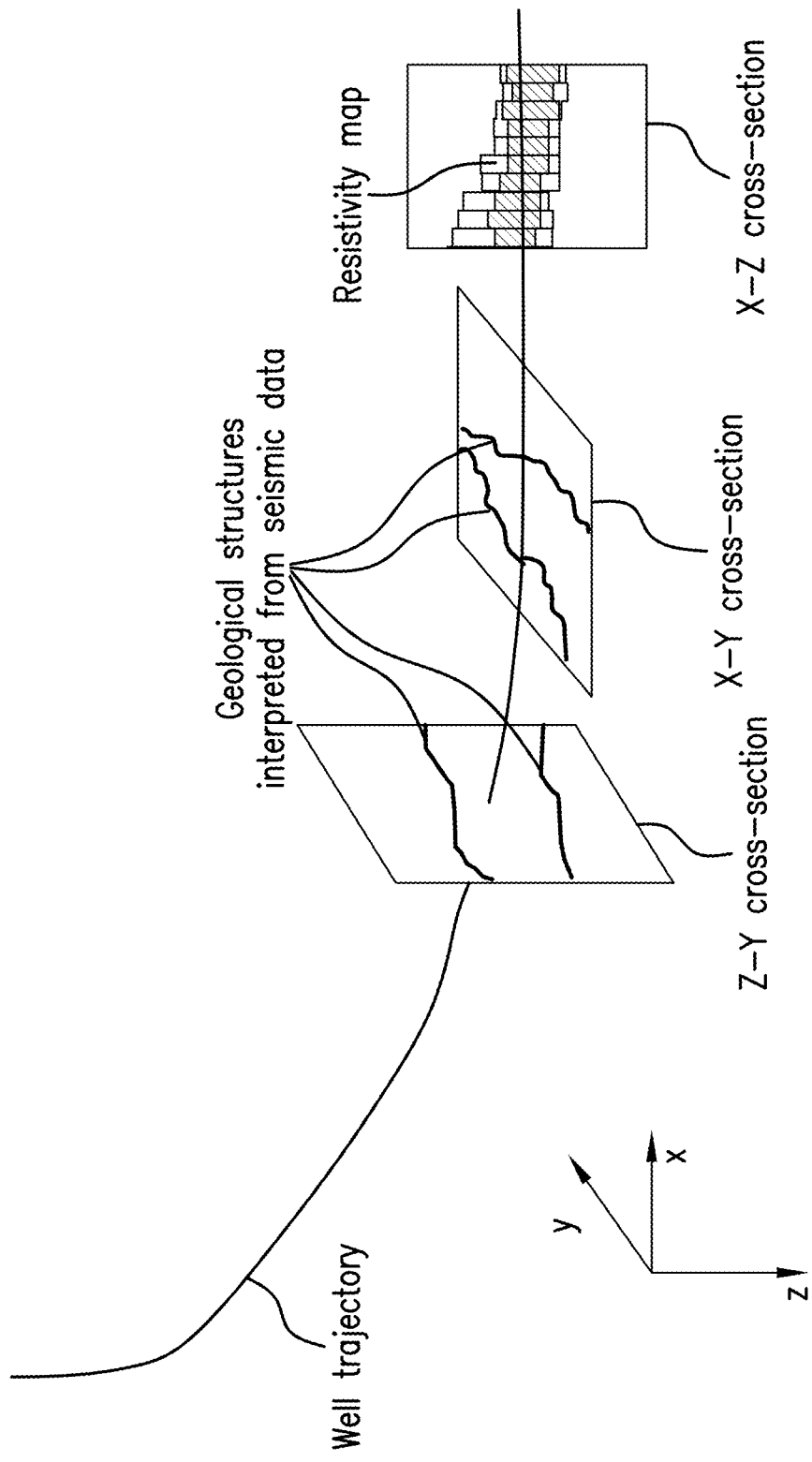
FIG. 3 depicts aspects of slicing a subsurface volume to obtain cross-sectional representations of geological structures.

The embodiment of FIG. 1 may be referred to as logging-while-drilling (LWD). In other embodiments, the downhole tools or sensors in the BHA 16 may be carried or conveyed by an armored wireline in an embodiment referred to as wireline logging. The tools sense formation properties as a function of distance into the borehole and the output of a tool, sensed property value versus depth or drilled distance, may be referred to as a log. It is well understood that a log may be a one-dimensional property sensed versus depth or a multi-dimensional property sensed versus depth. (An acoustic image is generally sensed versus time. Hence, the spatial sampling along the trajectory is to be differentiated from the sampling along the propagation direction of the sensing field.) For example, an image of the borehole wall is a two-dimensional, azimuthal representation of a formation property around the wellbore wall (petrophysical or rock property image). Even further, a three-dimensional representation of formation property may be recorded to provide a volume-based distribution of formation properties around a wellbore. The volume-based distribution of formation properties may be sliced in an arbitrary direction to provide a cross-sectional representation of the formation property. One example of slicing a subsurface volume to obtain cross-sectional representations of geological structures is given in FIG. 3. The property distribution in the cross-section is here referred to as the two-dimensional map of a formation property, such as illustrated in FIG. 2. (In illustrations such as FIG. 2, depth generally comes from migration of seismic data and not the measurement.) Of course, such maps can be used to extract structures of the subsurface such as faults, folds, fractures bedding planes etc. The maps thus provide another way of imaging structural information of the subsurface. These images must not be confused with rock property images of the borehole wall as described above.

Next, processing of sensed parameters by the downhole tools is discussed.

The resistivity distribution may be interpreted from the raw and/or corrected resistivity data acquired by logging-while-drilling tools. The interpretation is conducted by forward modeling the expected, synthetic tool response within a subsurface model, with the subsurface model describing the distribution of resistivities in the subsurface around the wellbore. The subsurface model is then iteratively adjusted until the expected, synthetic tool response coincides with the measurements of the logging-while-drilling tools.

The iterative adjustment can be conducted either manually or automatically using an appropriate inversion algorithm. Such inversion algorithms minimize the misfit between synthetic and measured logging data. Other embodiments of inversion algorithms are possible. These may select the forward model stochastically with our without guidance from previous iterations. It is also possible that more than one forward model is created at each iterative step. Other embodiments may combine stochastic and iterative approaches in the inversion process. Forward and/or inversion modeling results provide a distribution of the resistivity around and away from the wellbore, from which geological boundaries can be inferred. Boundaries may be rock boundaries such as the boundary between a low-resistive shale caprock and a highly-resistive oil-saturated reservoir. In addition, boundaries may originate from a resistivity contrast between different fluid types filled in a porous and/or fracture subsurface. One example includes the oil-water contact, with oil being highly resistive and water being usually highly conductive.

Figure 4:
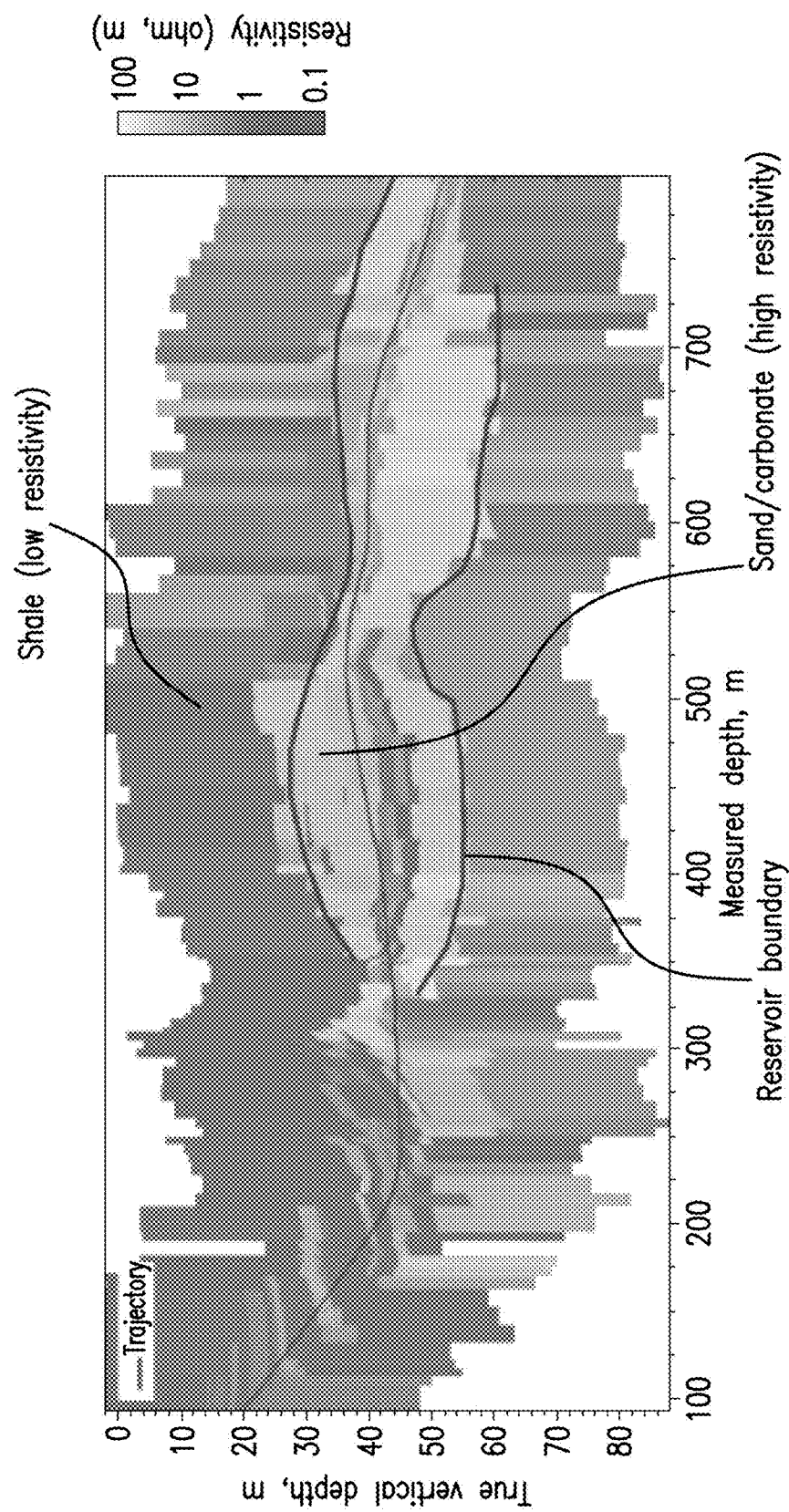
FIG. 4 depicts aspects of a map illustrating a formation bearing reservoir surrounding the borehole.
Figure 5A:
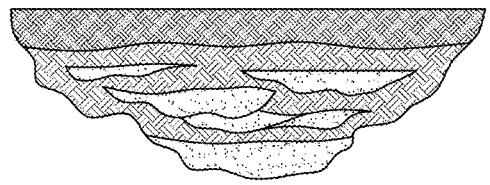
FIGS. 5A-5I, collectively referred to as FIG. 5, depict aspects of various channelized sand reservoirs.
Figure 5F:
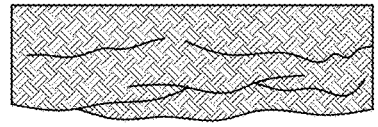
Figure 5B:
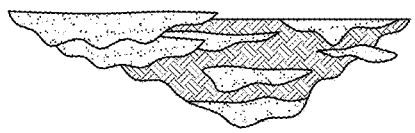
Figure 5G:
Figure 5C:
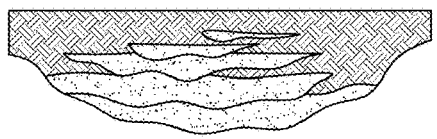
Figure 5H:
Figure 5D:
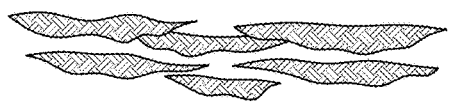
Figure 5I:
Figure 5E:
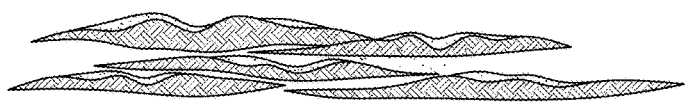

Whereas the detection of boundaries from resistivity contrasts is commonly used in reservoir navigation services, the resistivity distribution around the reservoir has not been used to determine water and/or hydrocarbon saturations away from the wellbore. An example for a resistivity distribution is shown in FIG. 4, which provides insight into the reservoir architecture. In particular, the reservoir boundaries can be mapped very well in this example.

One commonly used method to convert formation resistivity into formation water/oil saturation is the Archie model:

$$S_w = \left(\frac{aR_w}{R_t \phi^m}\right)^{1/n},$$

where Sw: water saturation; a: tortuosity factor (sometimes also called cementation constant); Rw: brine water resistivity; Rt: true formation resistivity; $\Phi$: porosity of the rock; m: cementation exponent; and n: saturation exponent.

A variety of alternative and/or modified methods exist to model formation water and/or hydrocarbon saturation. One way of modeling porosity from acoustic data is the use of Wyllie's equation:

$$\frac{1}{v} = \frac{\phi}{v_f} + \frac{(1-\phi)}{v_{ma}},$$

where: $\phi$=porosity of the rock; v=acoustic wave propagation velocity of the formation (ft/sec); $v_f$=velocity of interstitial fluids (ft/sec); and $v_{ma}$=velocity of the rock matrix (ft/sec). In terms of transit time ($\Delta t$, which is the inverse of acoustic velocity):

$$\Delta t = \phi \Delta t_f + (1-\phi)\Delta t_{ma}, \text{ or } \phi = \frac{\Delta t - \Delta t_{ma}}{\Delta t_f - \Delta t_{ma}},$$

where $\Delta t$=acoustic transit time (μsec/ft); $\Delta t_f$=acoustic transit time of interstitial fluids (μsec/ft); and $\Delta t_{ma}$=acoustic transit time of the rock matrix (μsec/ft).

Re-arrangement of Wyllie's equation will provide one means to determine the porosity of the rock which can then be used to determine the water saturation. It is well understood that porosity may be a total or effective porosity or another definition of void space occupied by a rock hosted by the subsurface. Mapping reservoirs and hydrocarbon saturations becomes more challenging with increasingly complex geologies. For example, channelized sand reservoirs can exhibit complex structures as illustrated by various channel structures in FIG. 5. A well trajectory may penetrate different zones of high resistivity. The resistivity distribution can thus be used to map hydrocarbons in place knowing that hydrocarbons have high resistivity values compared to water, from which a net-to-gross analysis can be conducted away from the wellbore.

One challenge with the calculation of resistivity distributions with forward and/or inversion methods is the ambiguity of the solution. In other words, different resistivity distribution maps can create the same misfit between synthetic and measured data, making the estimation of hydrocarbons in place from resistivity distributions alone ambiguous. However, reserves estimates need to be as certain as possible, hence any reduction in ambiguity of the resistivity map provides value to the hydrocarbon field operators.

One way to reduce the ambiguity of forward and/or inversion results is to constrain the underlying subsurface resistivity model using either a manual or automatic interpretation of the property map and/or additional measurements such as acoustic and/or seismic measurements which provide information of the structure of a subsurface surrounding a borehole. In one or more embodiments, sand bodies may be derived from a resistivity map, with the sand bodies being included in a larger geological formation surrounded by the geological boundaries as interpreted from acoustic, seismic or other sensors or tools.

Figure 6:
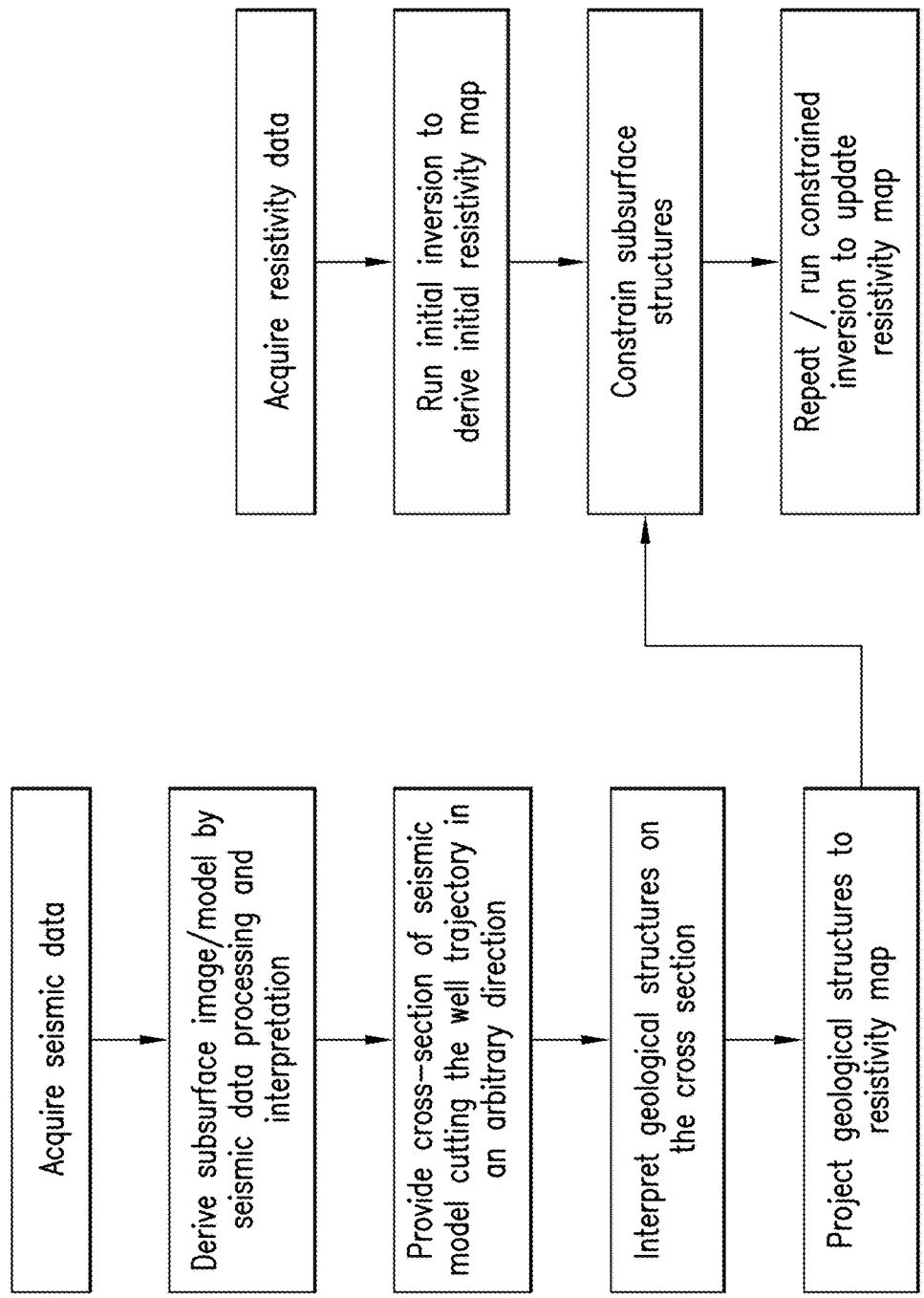
FIG. 6 is a workflow for deriving and updating a resistivity map.

In one or more embodiments, seismic data processing is used to identify zones of high hydrocarbon saturation. Structures of the high hydrocarbon-concentration bodies can be manually or automatically selected and superimposed on a resistivity map. The inversion can then be repeated after the structural earth model has been updated using the seismic information. A workflow illustrating this approach is given in FIG. 6 with arbitrary cross-sections given for example in FIG. 3.

In addition, the structure of a subsurface can be derived from azimuthal logs of formation properties at or near the borehole wall, referred to images (scan of physical properties of the wellbore wall and/or the vicinity of the wellbore wall). Such images can provide information about the existence, azimuth and inclination of bed boundaries, laminations, beddings etc.

Constrained interpretation and/or constrained inversion methods can make use of logging equipment which provides both, a distribution of formation properties, such as obtained from resistivity tools, and structural information of the subsurface away from the wellbore, such as obtained from acoustic tools. Structural information can be obtained for example from seismic-while-drilling equipment where geophones and/or hydrophones are positioned in a bottom-hole-assembly to detect the arrival of acoustic waves traveling from a seismic source, the source being either positioned at the surface or in another borehole. The interpretation of seismic-while-drilling data delivers a structural image of the subsurface. Identified structures can then be used to constrain a subsurface model representing the distribution of formation properties around the wellbore, such as the resistivity distribution.

Within this structurally constrained model, the resistivity values can then be iteratively adjusted until the synthetic resistivity data match the measured resistivity data. The resulting resistivity distribution is less ambiguous in a way that the structure of the distribution is constrained by an alternative source of information, and hence only the resistivity values within that subsurface structure provide a degree of freedom in the solution estimate.

As noted above, deep shear wave imaging or deep compressional wave imaging may provide additional information about formation structures. A logging-while-drilling device being capable of providing deep shear wave images and/or deep compressional wave images in conjunction with resistivity measurements can thus be used to provide a constrained resistivity map away from the wellbore.

Figure 7:
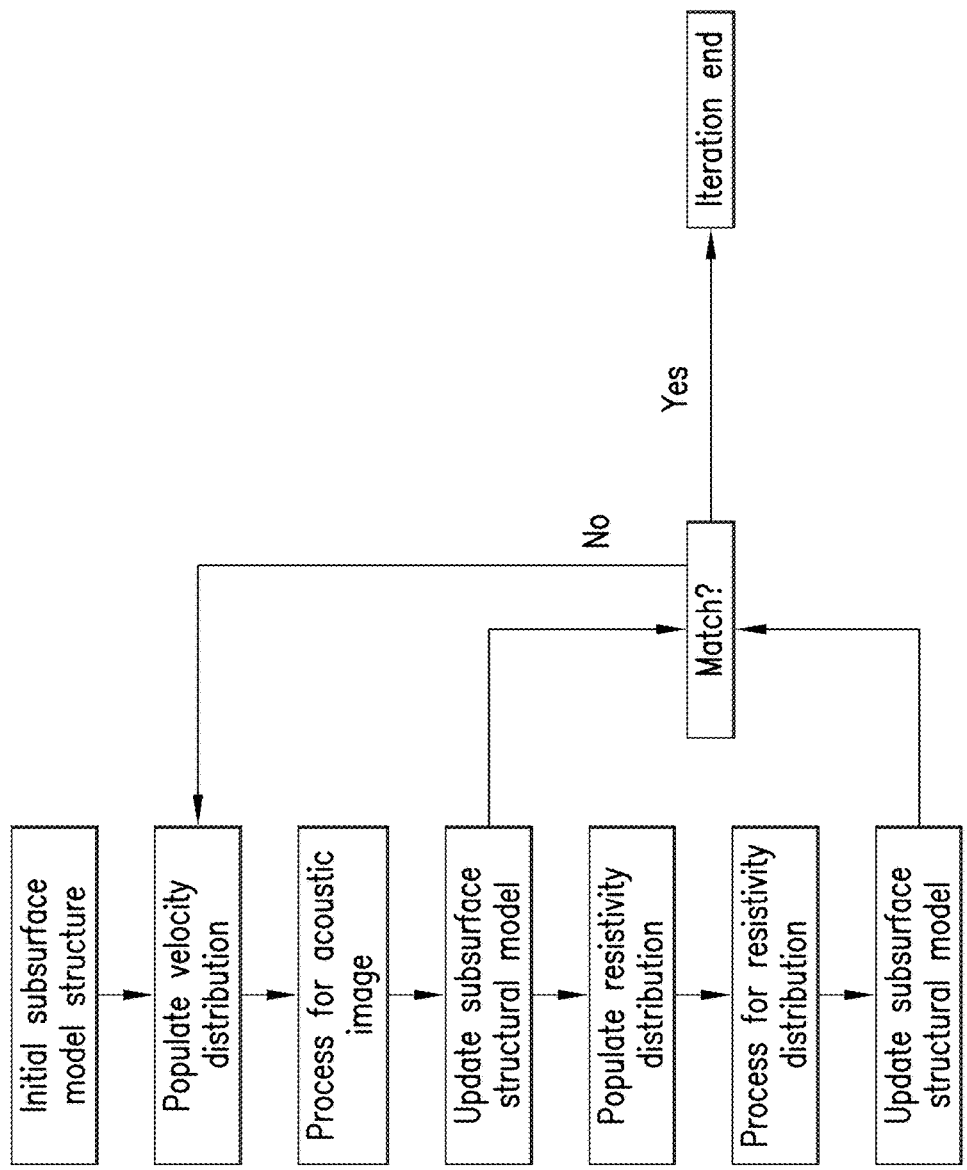
FIG. 7 is a flow chart for a method for using acoustic measurements and resistivity measurements within the same borehole to evaluate complementary formation structures.

The creation of deep shear wave or compressional images is achieved by processing methods such as migration and requires a velocity model away from the wellbore. The velocity model may thus also be constrained by the structural information obtained from contrasts in a resistivity distribution map. An iterative workflow as illustrated in FIG. 7 can thus be realized by the combination of methods. To evaluate if the structural model derived from two different types of measurements provides a match or misfit between synthetic data and measurement data requires either a person to visually analyze the two data types or an algorithm to automatically analyze the two data types. The models can then be adjusted and/or modified to reduce the misfit and provide an updated map or model. In general, the iterative workflow ends when there is no longer a misfit or the misfit is less than an acceptably low threshold value.

The acoustic velocity used to create the structural deep shear or compressional acoustic image might be derived from the interpretation of refraction acoustic data and/or guided waves as has been described above. The so derived near-field acoustic velocities may be populated deeper into the formation to prove a background velocity map away from the wellbore. The background velocity map may then be used to process/migrate reflection acoustic data to obtain a structural image away from the wellbore, together with a background density map acquired by a density tool. Structures interpreted from that image may then be used to constrain subsurface structures for the forward and/or inversion modeling of resistivity data. Inversion may then be repeated to obtain an updated resistivity map with more accurate resistivity values distributed away from the wellbore.

Figure 8:
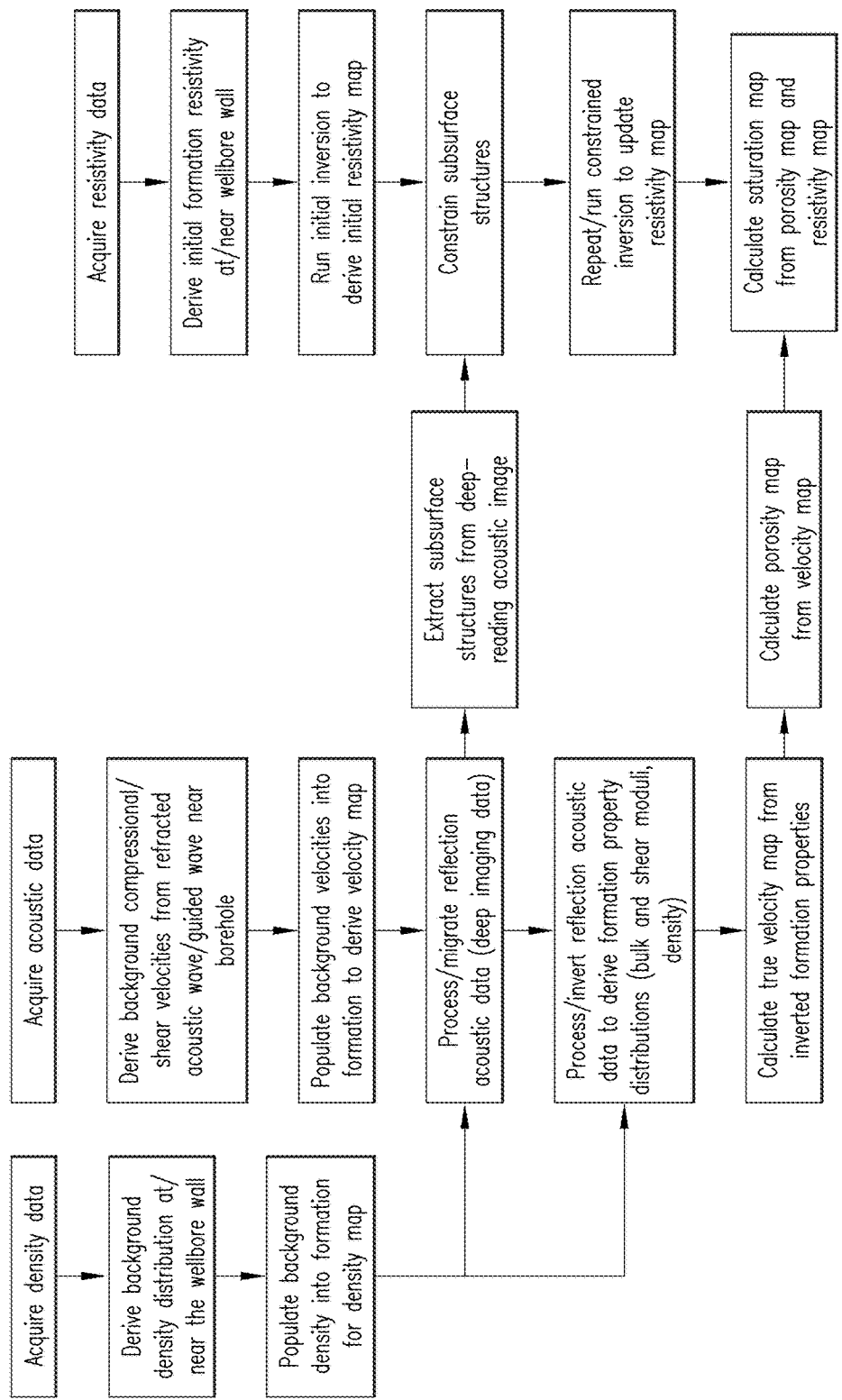
FIG. 8 is a workflow for calculating a saturation map from an acoustic velocity map and a resistivity map.

The calculation of saturations from a velocity and resistivity map may be conducted in conjunction with a petrophysical model describing a relationship between petrophysical rock and fluid properties which can be calculated from different formation evaluation data. Examples include a water and/or hydrocarbon saturation using Archie's equation for saturation and Wyllie's equation for porosity from acoustic velocity. A workflow illustrating this approach is given in FIG. 8. A processing workflow may also include the acquisition of density data to derive a background density distribution at or near the wellbore wall. Background density and velocities may be used to invert reflection acoustic data to derive acoustic formation properties such as bulk and shear moduli as a distribution around and away from the wellbore.

The distribution of bulk and shear moduli and density as inversion results may then be used to calculate a true velocity map using the relationship (assumed for homogeneous isotropic media) for compressional velocity:

$$v_P = \sqrt{\frac{K + \frac{4}{3}\mu}{\rho}}$$

Where K=bulk modulus, m=shear modulus, r=density; and for shear velocity:

$$v_s = \sqrt{\frac{\mu}{\rho}}.$$

The so-derived velocity distribution may then be used to calculate a porosity distribution, using for example Wyllie's equation as defined above. Porosity distribution and resistivity distribution may then be inserted into Archie's equation to calculate a saturation map around and away from the wellbore.

It is well understood that the above described workflow may be executed manually by iteratively forward modeling the formation property distributions, or automatically using a joint inversion algorithm. The joint inversion algorithm solves for an underlying petrophysical model (Archie saturation, Wyllie equation etc.) which describes the relationship of formation properties as derived from different acquisition methods.

It is also well understood that only a part of the described workflow may be applied to derive a saturation map with assumptions being made for those formation properties which are not considered in the processing. For example, a constant value for porosity may be assumed or any other means to derive a porosity map away from the wellbore may be considered to calculate a saturation map.

Figure 9:
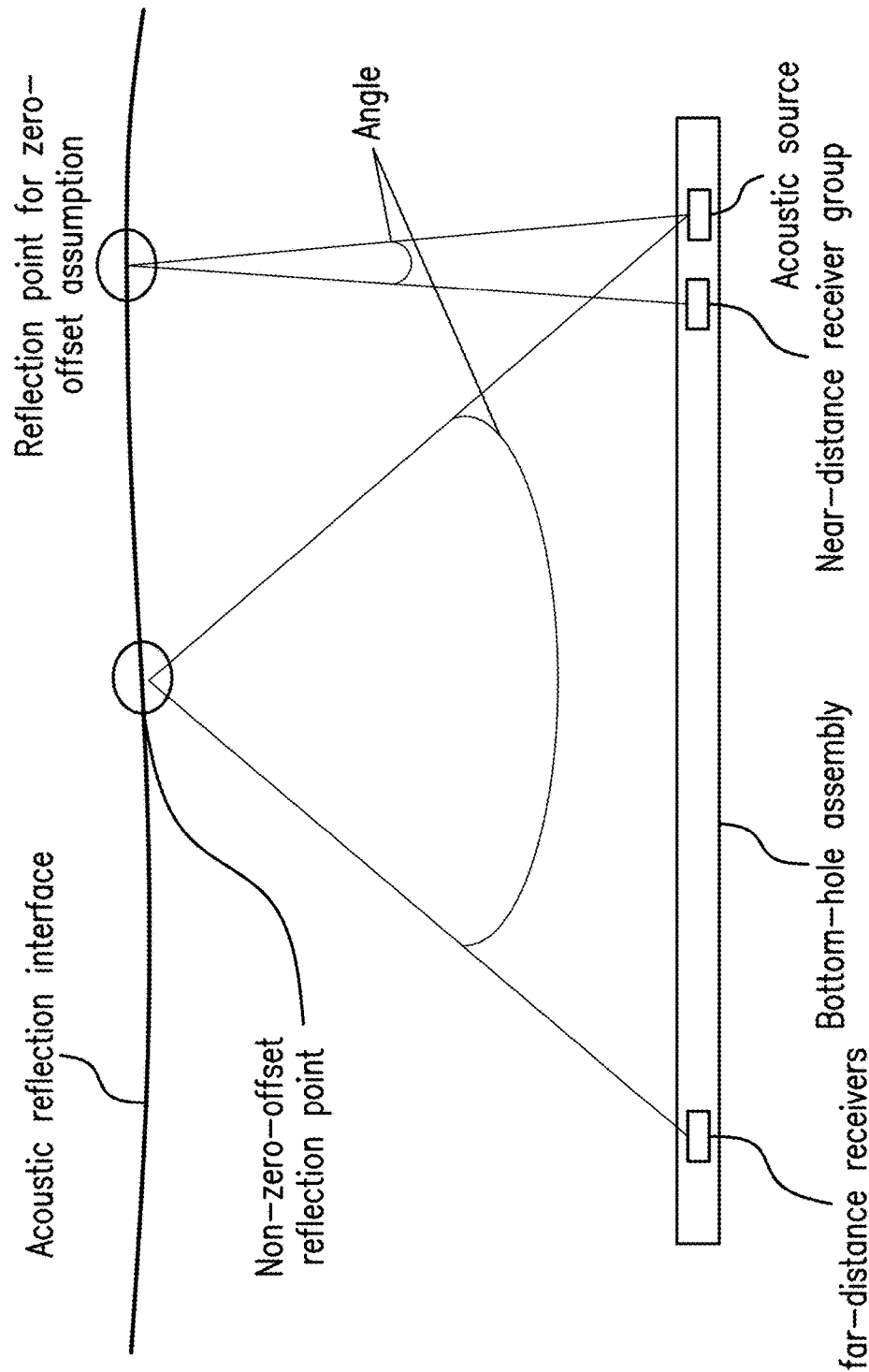
FIG. 9 depicts aspects of zero-offset and non-zero offset for acoustic reflection measurements.

The creation of deep shear or compressional wave images may be conducted by tool where acoustic sources and receivers (hydrophones and/or geophones) to record the arrival time of acoustic waves are sufficiently close to each other, so that a zero-offset assumption may hold. Zero-offset means that the angle between a transmitted and a reflected wave is sufficiently small so that this angle can be assumed zero. An illustration is given in FIG. 9. In contrast, source and receivers may be distributed along the bottom-hole assemble at a distance sufficiently large to provide an offset between transmitted and reflected acoustic waves. Under these conditions, additional acoustic wave processing and interpretation possibilities may be applied such as an amplitude-versus-offset (AVO) analysis. The interpretation results from AVO analysis may the also be used to additionally constrain the inversion of resistivity data.

Figure 10:
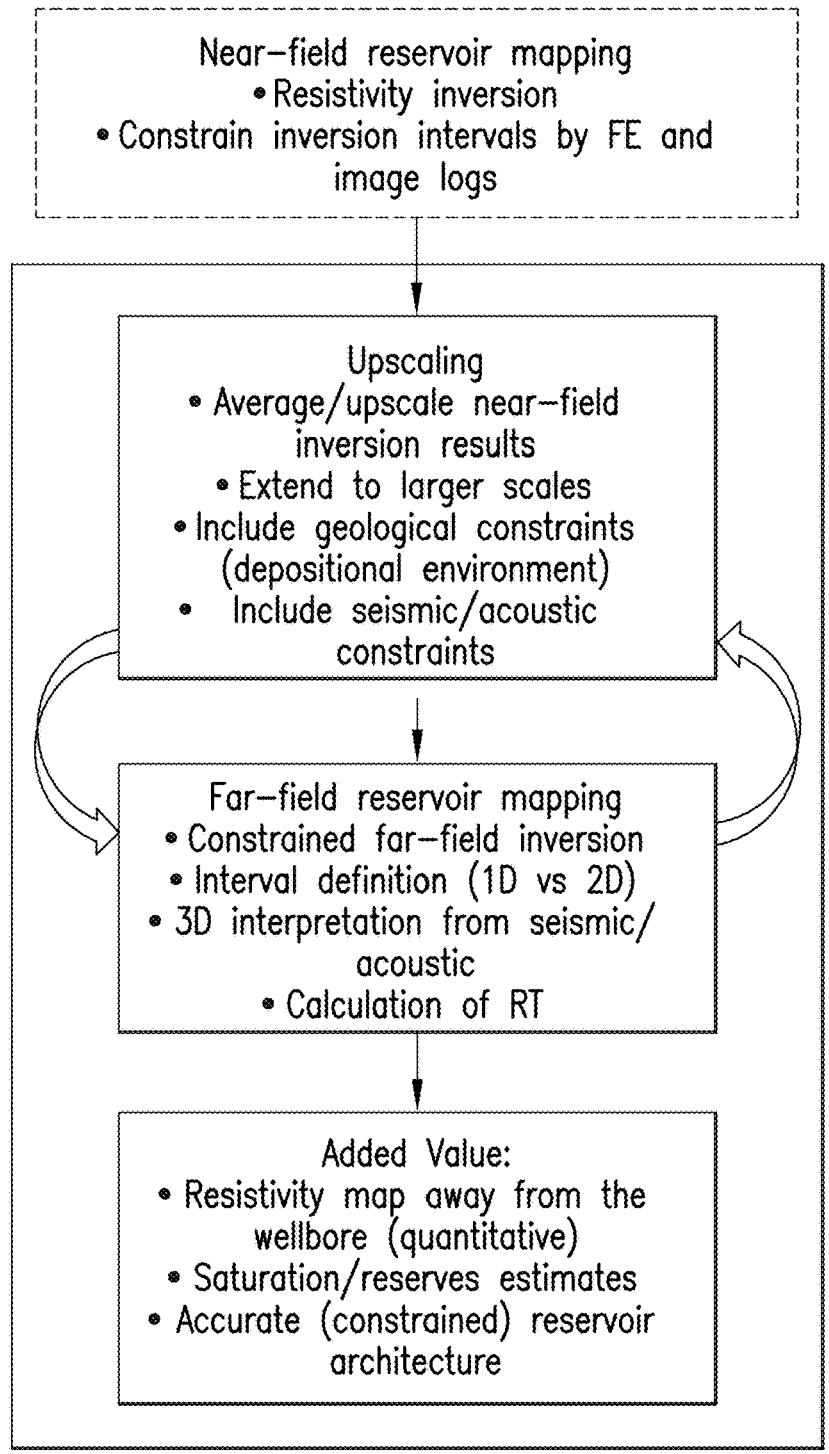
FIG. 10 is a flow chart for a method for upscaling a near-field reservoir map to a far-field reservoir map.
Figure 11:
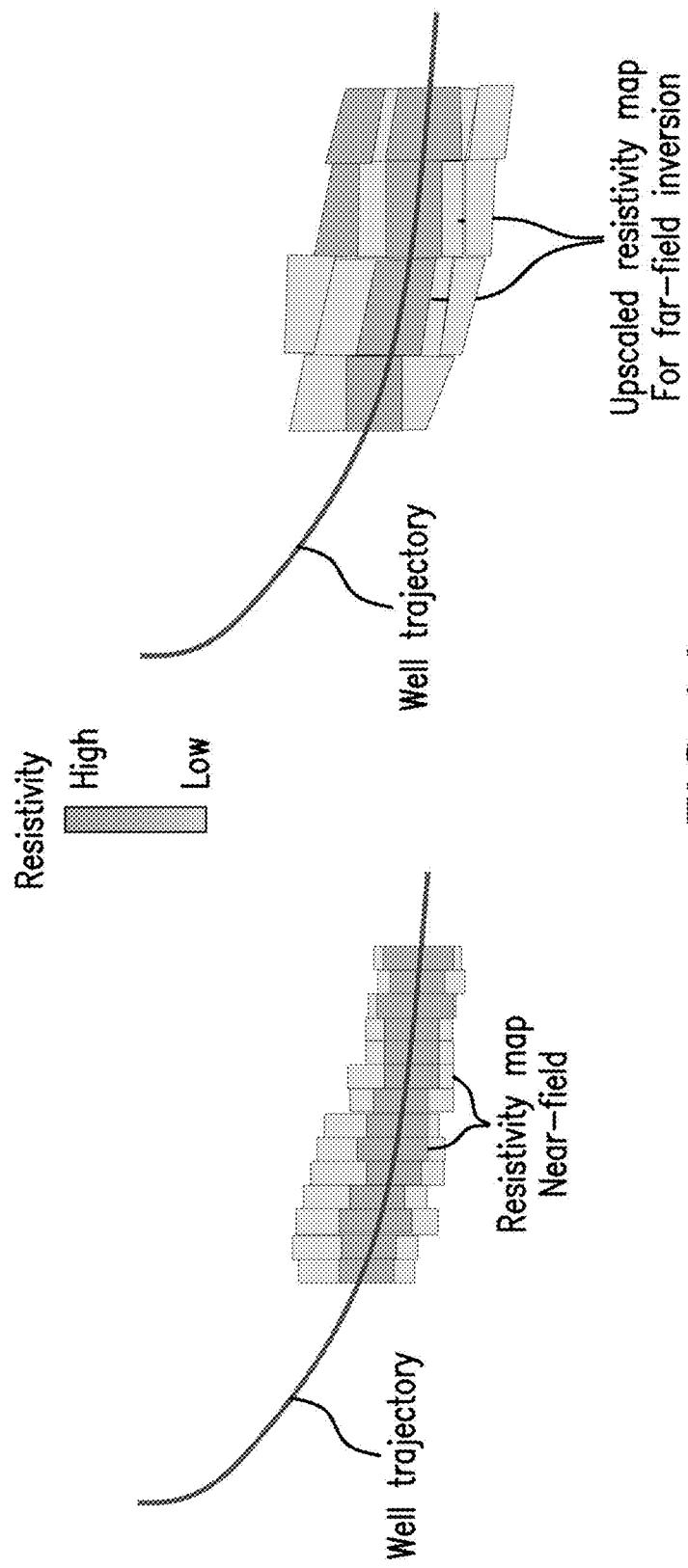
FIG. 11 depicts aspects of upscaling a resistivity map from a near-field map to a far-field map.

The population of subsurface properties for an initial resistivity and velocity model may require upscaling procedures to populate formation properties from near-wellbore logging data to the subsurface away from the wellbore. Because near-wellbore logging data are of higher resolution than logging data from deep-reading devices, the high-resolution data needs to be upscaled to become meaningful for forward and inversion modeling approaches away from the wellbore. The term "upscaling" relates to extrapolating the high resolution data (i.e., near-field) beyond the sensing range of the tool (i.e., far-field) from which the high resolution data was obtained. In one or more embodiments, existing near-field data values are extrapolated beyond the near-field until a known structure is encountered. Based on the geometry of the encountered structure, further data extrapolation may be employed. For example, a structure with a known tilt may cause the location of the extrapolated valued to tilt. A workflow illustrating the upscaling procedure is illustrated in FIG. 10. In FIG. 10, inversion intervals are constrained using formation evaluation (FE) logs and/or image logs. An example of upscaling a resistivity map from near-field to far-field maps is illustrated in FIG. 11. Here, a 1-dimensional inversion has been applied to resistivity data to provide a one-dimensional distribution of resistivity values represented by the stripes in FIG. 11. An upscaling procedure may be to combine multiple stripes from the near-field map into one average resistivity stripe of coarser resolution. The so-derived far-field stripe may then be used as a start model to invert far-field resistivity data.

Processing and interpretation of data acquired in a borehole can be conducted after a portion of a wellbore has been drilled such that the bottom-hole assembly (BHA) is pulled out of hole and the acquired data is downloaded from the memory contained in the tools within the BHA. Alternatively, data acquired during a drilling operation or interpretation results from processing methods conducted within a tool may be transmitted to the surface using appropriate transmission technologies such as mud pulse telemetry, wired-pipe etc. Those data obtained and/or processed downhole may be further communicated to surface systems. Such systems, for example software packages, may then be used to interpret the delivered data or information to make a decision about a drilling or completion related operation.

For example, during a drilling operation, a resistivity distribution map which has been constrained by structural information from acoustic imaging may be used to identify hydrocarbon saturations in remote reservoir bodies which are not connected to the borehole which is currently being drilled. A decision may be made to strategically steer into that remote reservoir body to enhance the ultimate recovery of the borehole being drilled.

Figure 12:
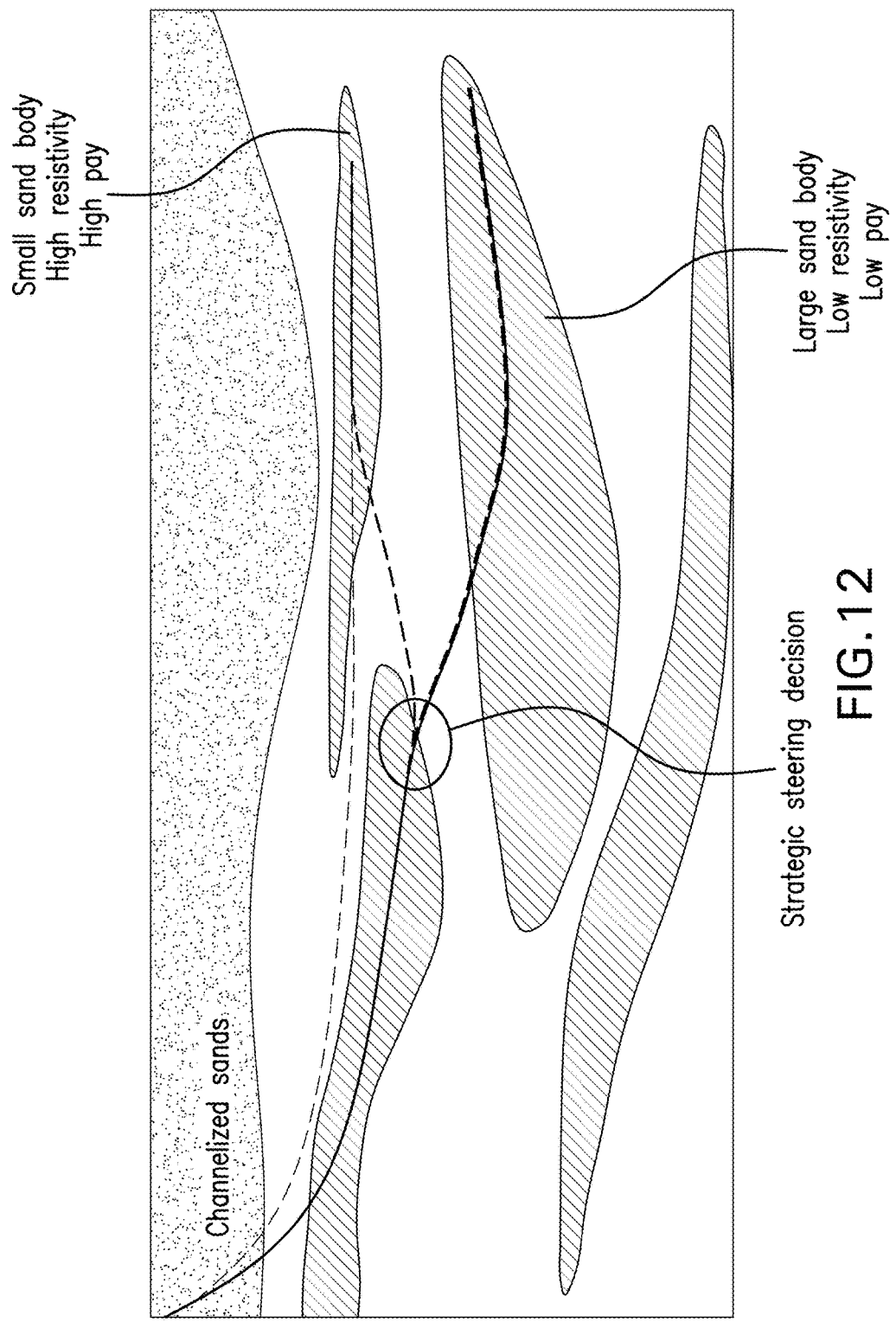
FIG. 12 depicts aspects of establishing a borehole trajectory.

Even further, a map of hydrocarbon saturations acquired during a drilling operation may be used to setup and/or update a static and/or dynamic reservoir model. That model may then be used to simulate and/or predict the expected reserves (amount of producible hydrocarbons) for the wellbore. Prognoses may be made for strategic geosteering or geostopping scenarios. FIG. 12 illustrates a strategic geosteering decision into remote reservoir bodies with high hydrocarbon saturation.

Figure 13:
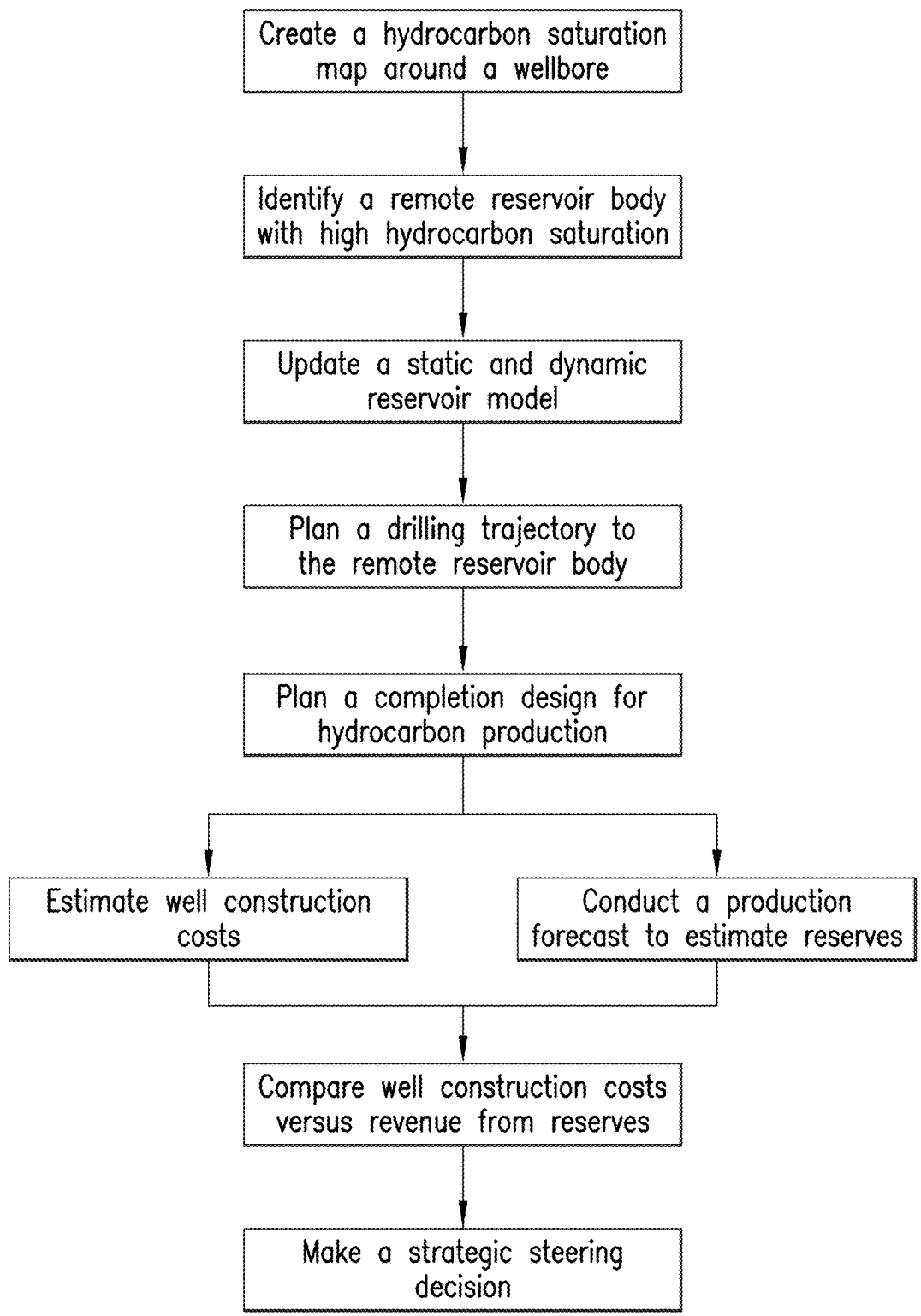
FIG. 13 is a flow chart for a method for making a strategic geosteering decision for drilling a borehole with a planned trajectory using a hydrocarbon saturation map of the formation surrounding the borehole.

With respect to the flow chart in FIG. 13, the continuation of a drilling operation into a remote reservoir body may be investigated, so that an indication of the additional well construction costs may be derived. Well construction costs may include the cost associated with the drilling operation and the completion of the wellbore. The cost is compared to potential revenue from production to determine if it is economically feasible to proceed with production. If it is economically feasible to proceed, then a strategic decision is made about a location and trajectory for drilling a new borehole or a location and trajectory for drilling a sidetrack or branch in an existing borehole in order to access further reserves of hydrocarbons.

In addition, updated static and dynamic reservoir models may be used to make a production forecast to estimate the additional and/or total amount of reserves which can be expected once the remote reservoir body is connected to the wellbore. Static models relate to sizes and dimensions of boundaries surrounding hydrocarbon bodies while dynamic models relate to how much hydrocarbons will flow under production conditions. Well construction cost and expected revenue may then be compared to make a strategic reservoir navigation decision.

In one scenario, the well construction costs associated with connecting the remote reservoir body may exceed the expected revenue from the predicted reserves. In such a case, a geostopping decision may be made, that is stopping the drilling operation and completion of the wellbore for production. In another scenario, the connection of the remote reservoir body may be profitable so that a geosteering decision is made: continue drilling. Such a scenario is of particular relevance for defragmented reservoirs such as having channelized sands (see FIG. 12 for example).

The evaluation of remote reserves from hydrocarbon distribution maps may not necessarily be conducted and used during a drilling operation. In another operational scenario, the hydrocarbon map may be analyzed and interpreted during a drilling operation or immediately after a drilling operation, and a strategic decision may be made to drill a sidetrack well into highly profitable remote reservoir bodies, following the same decision tree as illustrated in FIG. 13.

As an alternative, the use of multiple measurements by logging tools within the same borehole may provide insight into complementary geological structures, with each structure being interpreted from a different measurement. For example, oil-gas contact boundaries exhibit low resistivity contrasts, so that such boundaries not necessarily visible on a resistivity distribution map. However, an oil-gas contact exhibits a high acoustic impedance contrast, so that this contact is visible on an acoustic image. Of course, an appropriate method or algorithm can be developed to automatically or semi-automatically include the information about complementary structures into the "match" criterion of FIG. 5

Figure 14:
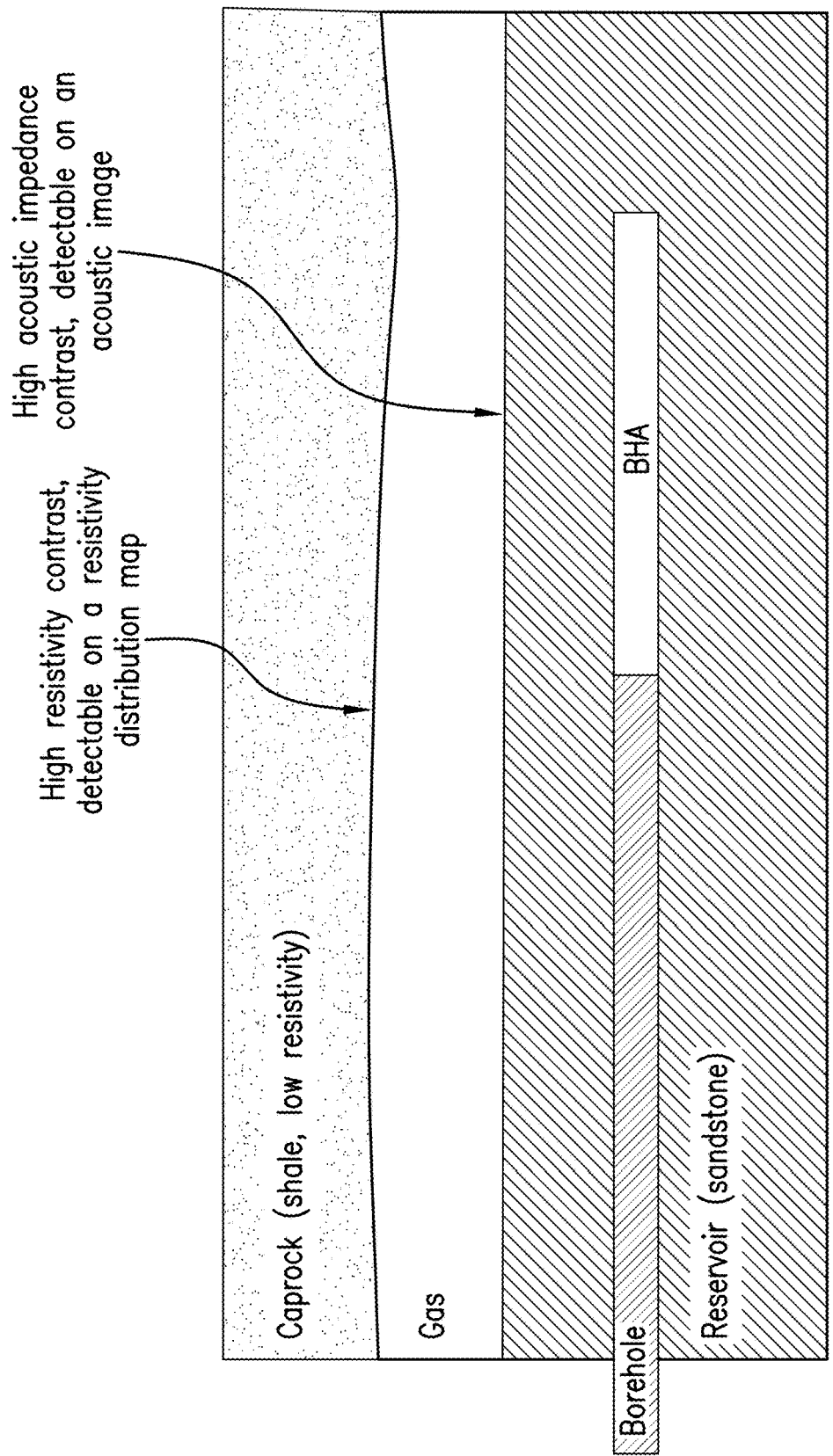
FIG. 14 depicts aspects of using resistivity measurements and acoustic measurements together to form a composite map of a reservoir.

A combined interpretation and/or constrained inversion is not applicable in this scenario, but the detection of multiple boundaries using multiple measurements can of course be used to make another strategic geosteering or geostopping decision. A geological scenario is illustrated in FIG. 14 where a wellbore is placed in a sandstone reservoir, the reservoir containing a gas cap above an oil zone. Of course, a variety of alternative scenarios may be assumed for various lithologies, etc.

Figure 15:
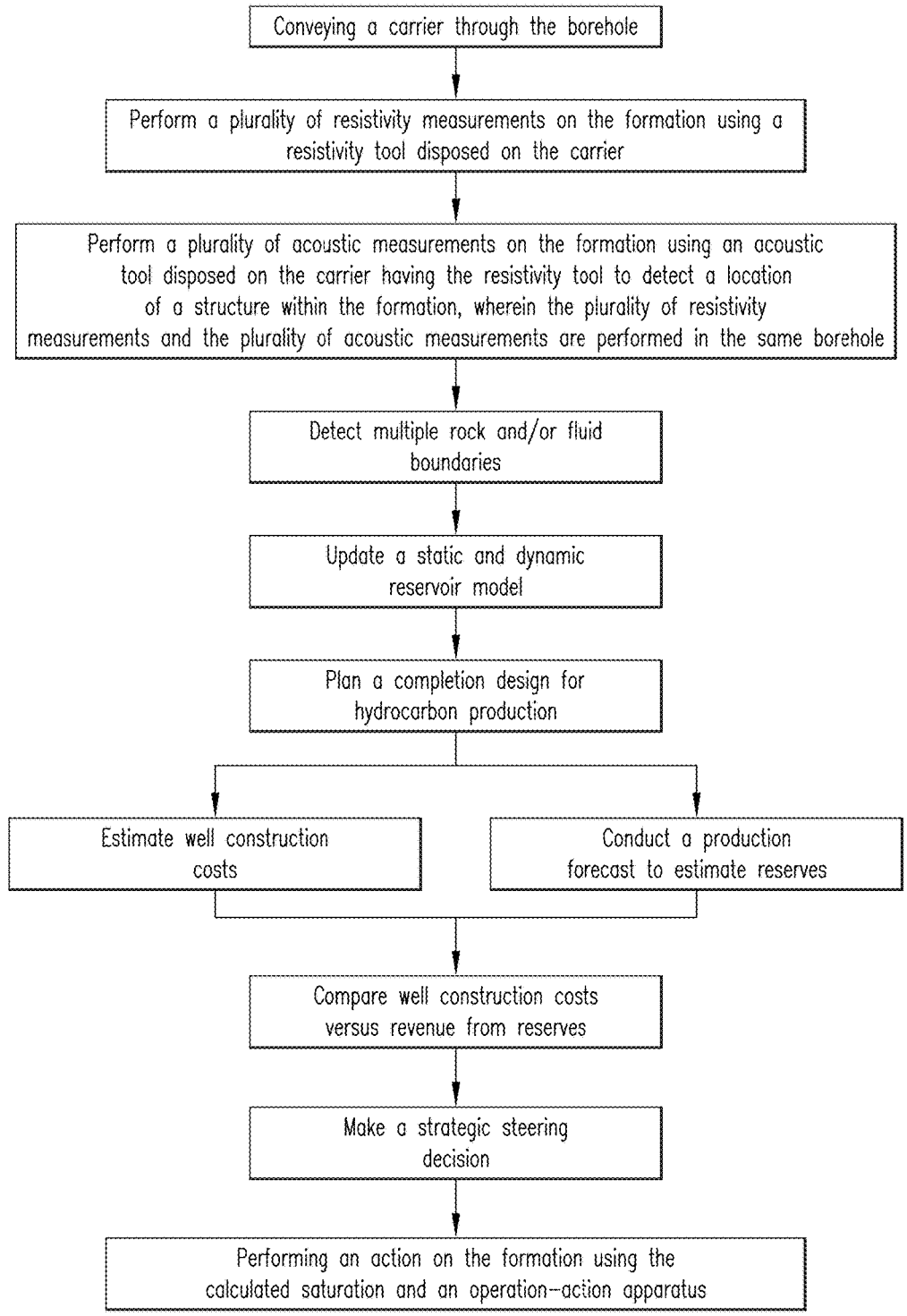
FIG. 15 is a flow chart for a method for making a strategic geosteering decision for implementing a completion plan using resistivity measurements and acoustic measurements.

The scenario may again be used to steer a borehole into a reservoir, with a steering decision being made upon the interpretation of multiple boundaries. The boundaries may again be used to follow a decision tree as illustrated in the flow chart in FIG. 15. The boundaries may be used to update the static and dynamic reservoir models to make a production forecast for reserves estimations. The estimated revenue from the reserves may again be compared against the estimated well construction costs to come to a geosteering or even geostopping decision. The operation-action apparatus discussed in FIG. 15 can be a drill string or drill string with a steering system in order to drill a borehole into the formation with a desired trajectory based on the calculated saturation. In general, the operation-action apparatus can be the drilling/production system 8 or any component or device that may perform an operation or action related to the formation based on or in response to information in the upscaled map. The operation or action may also be based on or in response to information such as saturation that is derived from the upscaled map.

In one scenario, the continuation of drilling may be profitable, hence geosteering may be preferred. In another scenario, the continuation of drilling and subsequent completion of a wellbore may exceed the well construction costs, so that the geostopping decision is made to stop the drilling operation and well completion for production purposes.

Set forth below are some embodiments of the foregoing disclosure:

Embodiment 1. A method for adjusting a parameter of a wellbore operation, the method comprising: conveying a carrier through the wellbore; performing a resistivity measurement on the formation using a resistivity tool disposed on the carrier; performing an acoustic measurement on the formation using an acoustic tool disposed on the carrier; generating with at least one processor a map of the formation using the resistivity measurement and the acoustic measurement, and adjusting the parameter using the map. In one or more embodiments, the wellbore operation may include a drilling operation, a production or completion operation, and/or installing borehole equipment. Some production or completion operations may include hydraulic fracturing, installation of a casing lining the wellbore, and/or perforating the casing at a desired depth. The resistivity tool may be any type of resistivity tool such as for example a propagation resistivity tool, an induction tool, a galvanic tool, and/or a laterolog tool, with one more transmitters or receivers. Each resistivity tool may be configured for imaging, measuring bulk resistivity and/or measuring azimuthal resistivity. The acoustic tool may be any type of acoustic tool that can operate on any one or more various wavelengths/frequencies with one more transmitters or receivers. Each acoustic tool may be configured for imaging, measuring a bulk acoustic related property and/or measuring an azimuthal acoustic related property. The term "map" does need to be a graphical representation. Any information that provides a link between a formation parameter or property and corresponding geometrical data may be considered a map. It can be appreciated that the formation parameter or property in the map can be any type of parameter or property of interest to a user. Map links a special information with a formation property. Can be any kind of formation property.

Embodiment 2. The method according to any prior embodiment, further comprising upscaling with the at least one processor the map to extend beyond the sensing range of the resistivity tool or the sensing range of the acoustic tool to provide an upscaled map.

Embodiment 3. The method according to any prior embodiment, wherein the wellbore operation comprises drilling a wellbore penetrating the formation.

Embodiment 4. The method according to any prior embodiment, further comprising: generating with the at least one processor one of a synthetic resistivity response and a synthetic acoustic response using the map; updating with the at least one processor the map based on one of (i) the synthetic resistivity response and a resistivity measurement and (ii) the synthetic acoustic response and an acoustic measurement to generate an updated map; and replacing with the at least one processor the map with the updated map.

Embodiment 5. The method according to any prior embodiment, wherein the map comprises one of an acoustic related value, a resistivity related value, a resistivity related value boundary, an acoustic related value boundary, a resistivity related value transition zone, an acoustic related value transition zone or some combination thereof. Embodiments of resistivity related values include: attenuation, phase difference, resistivity, conductivity, resistance, conductance, impedance, and/or other types resistivity measurements including parameters that can be derived from resistivity related values such as porosity, saturation, and/or other properties. A resistivity related value boundary is defined by a step change in the resistivity related value above a certain threshold. A resistivity related value transition zone is defined by a monotonic change of the resistivity related value above a certain threshold. Embodiments of acoustic related values include attenuation, travel time, and/or other acoustic measurements including parameters that can be derived from acoustic related values such as porosity, velocity, and/or other properties. An acoustic related value boundary is defined by a step change in the acoustic related value above a certain threshold. An acoustic related value transition zone is defined by a monotonic change of the acoustic related value above a certain threshold.

Embodiment 6. The method according to any prior embodiment, further comprising: calculating with the at least one processor a saturation at one or more locations in the formation represented in the map. The calculated saturation can be absolute or relative. In one or more embodiments, two resistivities may be used to calculate a relative saturation. That may be beneficial when the porosity is unknown and the absolute resistivity cannot be calculated.

Embodiment 7. The method according to any prior embodiment, further comprising (a) estimating a cost for drilling the wellbore or a branch, (b) estimating an amount of hydrocarbons to be extracted using the saturation at one or more locations in the map; and (c) adjusting the parameter using the cost for drilling and the amount of hydrocarbons.

Embodiment 8. The method according to any prior embodiment, wherein the operation comprises performing a completion of the wellbore using the saturation.

Embodiment 9. The method according to any prior embodiment, further comprising: determining a porosity at one or more locations in the formation represented in the map. The determined porosity can be can be absolute or relative.

Embodiment 10. The method of any prior embodiment, wherein the parameter includes drilling direction information.

Embodiment 11. The method of any prior embodiment, wherein the parameter includes drilling target location information.

Embodiment 12. The method of any prior embodiment, wherein the parameter includes wellbore trajectory information.

Embodiment 13. The method according to any prior embodiment, further comprising performing at least one other measurement of the formation, using the at least one other measurement to generate the map. The at least one other measurement may include a surface measurements and/or a downhole measurement.

Embodiment 14. The method according to any prior embodiment, wherein the other measurement comprises a nuclear measurement. The nuclear measurement may include a measurement of density, porosity, and/or natural gamma rays to include bulk measurements, azimuthal measurements, and/or imaging.

Embodiment 15. An apparatus for adjusting a parameter of a wellbore operation, the apparatus comprising: a carrier configured to be conveyed through the wellbore; a resistivity tool disposed on the carrier and configured to perform a resistivity measurement on the formation; an acoustic tool disposed on the carrier and configured to perform an acoustic measurement on the formation; at least one processor configured to: generate a map of the formation using the resistivity measurement and the acoustic measurement, and adjust the parameter using the map.

Embodiment 16. The apparatus according to any prior embodiment, wherein the at least one processor is further configured to: generate one of a synthetic resistivity response and a synthetic acoustic response using the map; update the map based on one of (i) the synthetic resistivity response and a resistivity measurement and (ii) the synthetic acoustic response and an acoustic measurement to generate an updated map; and replace the map with the updated map.

Embodiment 17. The apparatus according to any prior embodiment, wherein the map comprises one of an acoustic related value, a resistivity related value, a resistivity related value boundary, an acoustic related value boundary, a resistivity related value transition zone, an acoustic related value transition zone or some combination thereof.

Embodiment 18. The apparatus according to any prior embodiment, wherein the at least one processor is further configured to calculate a saturation at one or more locations in the formation represented in the map.

Embodiment 19. The apparatus according to any prior embodiment, further comprising a steering system coupled to a drill tubular and configured to drill a new borehole or a branch from an existing borehole into the formation with a selected trajectory to a location having a selected saturation.

Embodiment 20. The apparatus according to any prior embodiment, further comprising another downhole tool disposed on the carrier and configured to perform at least one other type of measurement on the formation and wherein the at least one processor is further configured to use the at least one other type of measurement to generate the map.

Embodiment 21. The apparatus according to any prior embodiment, wherein the another downhole tool comprises a nuclear measurement tool.

In support of the teachings herein, various analysis components may be used, including a digital and/or an analog system. For example, the downhole electronics 11, the computer processing system 12, or the sensors 7, 8 or 13 may include digital and/or analog systems. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a non-transitory computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a power supply (e.g., at least one of a generator, a remote supply and a battery), cooling component, heating component, magnet, electromagnet, sensor, electrode, transmitter, receiver, transceiver, antenna, controller, optical unit, electrical unit or electromechanical unit may be included in support of the various aspects discussed herein or in support of other functions beyond this disclosure.

The term "carrier" as used herein means any device, device component, combination of devices, media and/or member that may be used to convey, house, support or otherwise facilitate the use of another device, device component, combination of devices, media and/or member. The logging tool 10 is one non-limiting example of a carrier. Other exemplary non-limiting carriers include drill strings of the coiled tube type, of the jointed pipe type and any combination or portion thereof. Other carrier examples include casing pipes, wirelines, wireline sondes, slickline sondes, drop shots, bottom-hole-assemblies, drill string inserts, modules, internal housings and substrate portions thereof.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list of at least two terms is intended to mean any term or combination of terms. The terms "first," "second" and the like do not denote a particular order, but are used to distinguish different elements. The term "coupled" relates to a first component being coupled to a second component either directly or through an intermediate component. The term "configured" relates to one or more structural limitations of a device that are required for the device to perform the function or operation for which the device is configured.

While one or more embodiments have been shown and described, modifications and substitutions may be made thereto without departing from the spirit and scope of the invention. Accordingly, it is to be understood that the present invention has been described by way of illustrations and not limitation.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for adjusting a physical parameter of a wellbore operation, the method comprising:
conveying a carrier through a wellbore;
performing a resistivity measurement on a formation surrounding the wellbore using a resistivity tool disposed on the carrier;
performing an acoustic measurement on the formation using an acoustic tool disposed on the carrier;
generating with at least one processor a map of the formation,
interpreting with the at least one processor one or more geological structures of the formation based on the acoustic measurement and updating the map by using a constrained inversion of the resistivity measurement based on the one or more geological structures of the formation to provide an updated map; and
adjusting the physical parameter of the wellbore operation using the updated map.

2. The method according to claim 1, further comprising upscaling with the at least one processor the map to extend beyond the sensing range of the resistivity tool or the sensing range of the acoustic tool to provide an upscaled map.

3. The method according to claim 1, wherein the wellbore operation comprises drilling a wellbore penetrating the formation.

4. The method according to claim 1, further comprising:
generating with the at least one processor one of a synthetic resistivity response and a synthetic acoustic response using the map;
updating with the at least one processor the map based on one of (i) the synthetic resistivity response and the resistivity measurement and (ii) the synthetic acoustic response and the acoustic measurement to generate the updated map; and
replacing with the at least one processor the map with the updated map.

5. The method according to claim 1, wherein the map comprises one of an acoustic related value, a resistivity related value, a resistivity related value boundary, an acoustic related value boundary, a resistivity related value transition zone, an acoustic related value transition zone or some combination thereof.

6. The method according to claim 1, further comprising: calculating, with the at least one processor, a saturation at one or more locations in the formation represented in the map.

7. The method according to claim 6, further comprising (a) estimating a cost for drilling the wellbore or a branch, (b) estimating an amount of hydrocarbons to be extracted using the saturation at one or more locations in the map; and (c) adjusting the physical parameter using the cost for drilling and the amount of hydrocarbons.

8. The method according to claim 6, wherein the wellbore operation comprises performing a completion of the wellbore using the saturation.

9. The method according to claim 1, further comprising:
determining a porosity at one or more locations in the formation represented in the map.

10. The method of claim 1, wherein the physical parameter includes drilling direction information.

11. The method of claim 1, wherein the physical parameter includes drilling target location information.

12. The method of claim 1, wherein the physical parameter includes wellbore trajectory information.

13. The method according to claim 1, further comprising performing at least one other measurement of the formation, using the at least one other measurement to generate the map.

14. The method according to claim 13, wherein the other measurement comprises a nuclear measurement.

15. An apparatus for adjusting a physical parameter of a wellbore operation, the apparatus comprising:
a carrier configured to be conveyed through a wellbore;
a resistivity tool disposed on the carrier and configured to perform a resistivity measurement on a formation surrounding the wellbore;
an acoustic tool disposed on the carrier and configured to perform an acoustic measurement on the formation;
at least one processor configured to:
generate a map of the formation,
interpret one or more geological structures of the formation based on the acoustic measurement and updating the map by using a constrained inversion of the resistivity measurement based on the one or more geological structures of the formation to provide an updated map; and
adjust the physical parameter of the wellbore operation using the updated map.

16. The apparatus according to claim 15, wherein the at least one processor is further configured to:
generate one of a synthetic resistivity response and a synthetic acoustic response using the map;
update the map based on one of (i) the synthetic resistivity response and the resistivity measurement and (ii) the synthetic acoustic response and the acoustic measurement to generate the updated map; and
replace the map with the updated map.

17. The apparatus according to claim 15, wherein the map comprises one of an acoustic related value, a resistivity related value, a resistivity related value boundary, an acoustic related value boundary, a resistivity related value transition zone, an acoustic related value transition zone or some combination thereof.

18. The apparatus according to claim 15, wherein the at least one processor is further configured to calculate a saturation at one or more locations in the formation represented in the map.

19. The apparatus according to claim 18, further comprising a steering system coupled to a drill tubular and configured to drill a new borehole or a branch from an existing borehole into the formation with a selected trajectory to a location having a selected saturation.

20. The apparatus according to claim 15, further comprising another downhole tool disposed on the carrier and configured to perform at least one other type of measurement on the formation and wherein the at least one processor is further configured to use the at least one other type of measurement to generate the map.

21. The apparatus according to claim 20, wherein the another downhole tool comprises a nuclear measurement tool.

\* \* \* \* \*